UNITED STATES PATENT OFFICE.

ALBERT J. SCHUMACHER, OF SAN FRANCISCO, CALIFORNIA.

PROCESS OF MANUFACTURE OF HYDROGEN PEROXID.

1,398,468. Specification of Letters Patent. Patented Nov. 29, 1921.

No Drawing. Application filed November 9, 1920. Serial No. 422,942.

*To all whom it may concern:*

Be it known that I, ALBERT J. SCHUMACHER, a citizen of the United States, residing in the city and county of San Francisco and State of California, have invented a new and useful Improvement in a Process of Manufacture of Hydrogen Peroxid, of which the following is a specification.

My invention relates to improvements in the process of manufacture of hydrogen peroxid for barium dioxid, and particularly to that step in the process wherein the reacted barium is precipitated.

The primary object of my invention is to provide an improved process for manufacturing hydrogen peroxid adapted to increase the yield from a fixed quantity of barium dioxid.

A further object of my invention is to provide an improved method of precipitating reacted barium to reduce loss of hydrogen peroxid by decomposition from heat.

In the commercial preparation of hydrogen peroxid the process consists, in brief, of the addition of barium dioxid to a solution of an acid adapted to react with the barium dioxid to produce hydrogen peroxid and a soluble salt barium and the subsequent precipitation of the reacted barium by means of sulfuric acid. I prefer to use phosphoric acid to produce the hydrogen peroxid, a brief description of which process follows.

To a dilute aqueous solution of phosphoric acid of known strength contained in a suitable mixing vat, I add a quantity of barium dioxid calculated to react with quantity of phosphoric acid present in the solution to produce acid barium phosphate and hydrogen peroxid, both products being retained in aqueous solution. To precipitate the barium from solution I add a quantity of cold dilute sulfuric acid sufficient to react with all the barium prosphate formed, thereby causing the barium to be precipitated as barium sulfate and reforming the phosphoric acid originally present, minus such quantity as may be lost by precipitation as basic barium phosphate or occluded by the precipitated barium sulfate. Barium dioxid is again added to react with the reformed phosphoric acid as above, and the second addition of barium precipitated, by the addition of a second quantity of sulfuric acid and the phosphoric acid again liberated. In this manner barium dioxid and sulfuric acid are added alternately until the concentration of hydrogen peroxid in the solution has been built up to the desired degree. The solution within the mixing vat is agitated continuously during the successive additions of barium dioxid and sulfuric acid to insure complete reaction, the mixture being constantly cooled to prevent excessive heat within the mixing vat. When the concentration of hydrogen peroxid has reached the desired degree the greater part of the phosphoric acid will have been precipitated as basic barium phosphate. Such acid phosphate as does remain free in solution being precipitated as basic barium phosphate, and the last trace of barium precipitated by further addition of sulfuric acid.

My invention resides particularly in the manner in which sulfuric acid is added in the above process, or equivalent processes performed with acids other than phosphoric. Hydrogen peroxid, as is well known, is an unstable product easily decomposed by a slight excess of heat. As above mentioned, the mixing vat is constantly cooled to prevent the temperature of the solution from exceeding a maximum of 110° F., a temperature of 70° F. being preferred. In precipitating barium by means of sulfuric acid the common practice has been to introduce small quantities of concentrated sulfuric acid directly into the mixing vat. As is commonly known, the hydration of concentrated sulfuric acid results in the generating of a high degree of heat. In the present process, the addition of the concentrated acid to the aqueous solution generates heat in the usual manner, an excessive temperature being formed locally within the solution immediately surrounding the point at which the acid is introduced. Continuous stirring prevents this overheated condition from enduring long, as the solution becomes mixed and the heat distributed throughout the vat, however, the local excess of heat formed instantly upon the introduction of concentrated acid is sufficient to cause the hydrogen peroxid present in that portion of the solution to be decomposed and lost. To prevent this loss I have devised a method of precipitating the barium from solution without the formation of excessive heat within the solution thereby preventing decomposition and loss of hydrogen peroxid from solution and correspondingly increasing the yield.

In my improved process, concentrated sulfuric acid and water are simultaneously admitted to a suitable watercooled container, the heat formed by the hydration of the acid being partially absorbed by the cooling water. Hydrated acid from the cooling container is then passed through water cooled coils or other suitable conduits whereby the hydrated acid is reduced to the temperture of the cooling medium, and introduced into the mixing vat as required. In this manner the initial heat of hydration is absorbed previous to the introduction of the acid into the mixing vat, the acid diluted to such an extent that the further hydration of the acid within the mixing vat solution does not generate an appreciable degree of heat. In this manner local excesses of heat are prevented and the decomposition and loss of hydrogen peroxid due to this cause prevented.

In practice I adjust the supply of acid and water into the water cooled container to meet the requirement for the mixing vat the quantity of acid hydrated being made just equal to the quantity introduced into the process, thereby permitting the hydration of acid to be carried on without interruption throughout the process. Any suitable container may be utilized for the purpose, but I prefer a container having an outlet at approximately half way between the bottom and the top in order that the hydration of the acid may occur in a cooled hydrated body of acid from which delivery may be made as required through cooled conduits without exhausting the supply of hydrated acid in the container into which concentrated acid and water are being admitted, thereby insuring the delivery of cooled acid to the mixing vat.

Having thus described my invention what I claim as new and desire to secure by Letters Patent is,

1. The process of manufacturing hydrogen peroxid comprising the addition of barium dioxid to a dilute solution of phosphoric acid to form hydrogen peroxid and barium acid phosphate; and the addition of continuously cooled hydrated sulfuric acid to liberate phosphoric acid and precipitate the barium from the barium acid phosphate without the formation of local heat excess at the point of introduction.

2. The step in the process of manufacturing hydrogen peroxid of continuously cooling sulfuric acid during hydration and admitting said cooled hydrated sulfuric acid to the process through cooled conduits as and for the purposes described.

In witness whereof I hereunto set my signature.

ALBERT J. SCHUMACHER.